United States Patent
Belanger et al.

(10) Patent No.: US 10,155,503 B2
(45) Date of Patent: *Dec. 18, 2018

(54) VEHICLE WASH PACKAGE SELECTION CONFIRMATION SYSTEM

(71) Applicant: WashMe Properties, LLC, Northville, MI (US)

(72) Inventors: Michael J. Belanger, Northville, MI (US); Barry S. Turner, Novi, MI (US); Curtis S. Prater, Warren, MI (US)

(73) Assignee: WashMe Properties, LLC, Northville, MI (US)

(*) Notice: Subject to any disclaimer, the term of this patent is extended or adjusted under 35 U.S.C. 154(b) by 532 days.

This patent is subject to a terminal disclaimer.

(21) Appl. No.: 14/687,704

(22) Filed: Apr. 15, 2015

(65) Prior Publication Data
US 2016/0063591 A1 Mar. 3, 2016

Related U.S. Application Data

(60) Provisional application No. 62/045,208, filed on Sep. 3, 2014.

(51) Int. Cl.
*G06Q 30/00* (2012.01)
*B60S 3/00* (2006.01)
(Continued)

(52) U.S. Cl.
CPC .............. *B60S 3/004* (2013.01); *B08B 1/002* (2013.01); *B08B 1/02* (2013.01); *B08B 1/04* (2013.01);
(Continued)

(58) Field of Classification Search
CPC ........................................ G06Q 30/06–30/08
(Continued)

(56) References Cited

U.S. PATENT DOCUMENTS 5,509,538 A * 4/1996 Spindler .............. B65G 1/1376
198/370.01
9,714,011 B2 7/2017 Belanger
(Continued)

FOREIGN PATENT DOCUMENTS

DE 202007000532 U1 5/2008
WO 02099579 A2 12/2002

OTHER PUBLICATIONS

Fleenor, G.F., "Turning Pennies into Dollars: Give Car-wash Customers Added Value They Can See, Smell, or Feel and Increase Revenue" (National Petroleum News 98.7, Jul. 2006: (40): 4) http://dialoq.proquest.com/professional/docview/671440918?accountid=142257 (Year: 2006).*

(Continued)

*Primary Examiner* — Ethan D Civan
(74) *Attorney, Agent, or Firm* — John S. Artz; Dickinson Wright PLLC

(57) ABSTRACT

A vehicle wash system includes a wash package selection zone where a vehicle operator is presented with a plurality of different vehicle wash packages. Each of the vehicle wash packages has an associated unique color identifier. The system includes a controller configured to receive a selection from the vehicle operator of one of the plurality of different vehicle wash packages. The system includes a vehicle treatment zone, including at least one illumination element associated therewith. The at least one illumination element is in communication with the controller. The controller is configured to emit light from the at least one illumination element in a color that corresponds to the color identifier of the vehicle package selected by the vehicle operator.

35 Claims, 6 Drawing Sheets

(51) Int. Cl.
| | |
|---|---|
| *G06Q 30/06* | (2012.01) |
| *B60S 3/04* | (2006.01) |
| *G06Q 50/00* | (2012.01) |
| *B60S 3/06* | (2006.01) |
| *B08B 1/00* | (2006.01) |
| *B08B 1/02* | (2006.01) |
| *B08B 1/04* | (2006.01) |
| *B08B 3/00* | (2006.01) |
| *B08B 3/02* | (2006.01) |

(52) U.S. Cl.
CPC .............. *B08B 3/003* (2013.01); *B08B 3/022* (2013.01); *B60S 3/04* (2013.01); *B60S 3/06* (2013.01); *G06Q 30/0601* (2013.01); *G06Q 30/0623* (2013.01); *G06Q 50/00* (2013.01)

(58) Field of Classification Search
USPC ................................................ 705/26.1–27.2
See application file for complete search history.

(56) References Cited

U.S. PATENT DOCUMENTS

| 9,862,359 | B2* | 1/2018 | Belanger | B60S 3/004 |
| 2005/0116667 | A1* | 6/2005 | Mueller | E04F 13/08 |
| | | | | 315/312 |
| 2006/0229891 | A1* | 10/2006 | Grier | G06Q 20/20 |
| | | | | 705/16 |

OTHER PUBLICATIONS

European International Search Report dated Oct. 13, 2015.

* cited by examiner

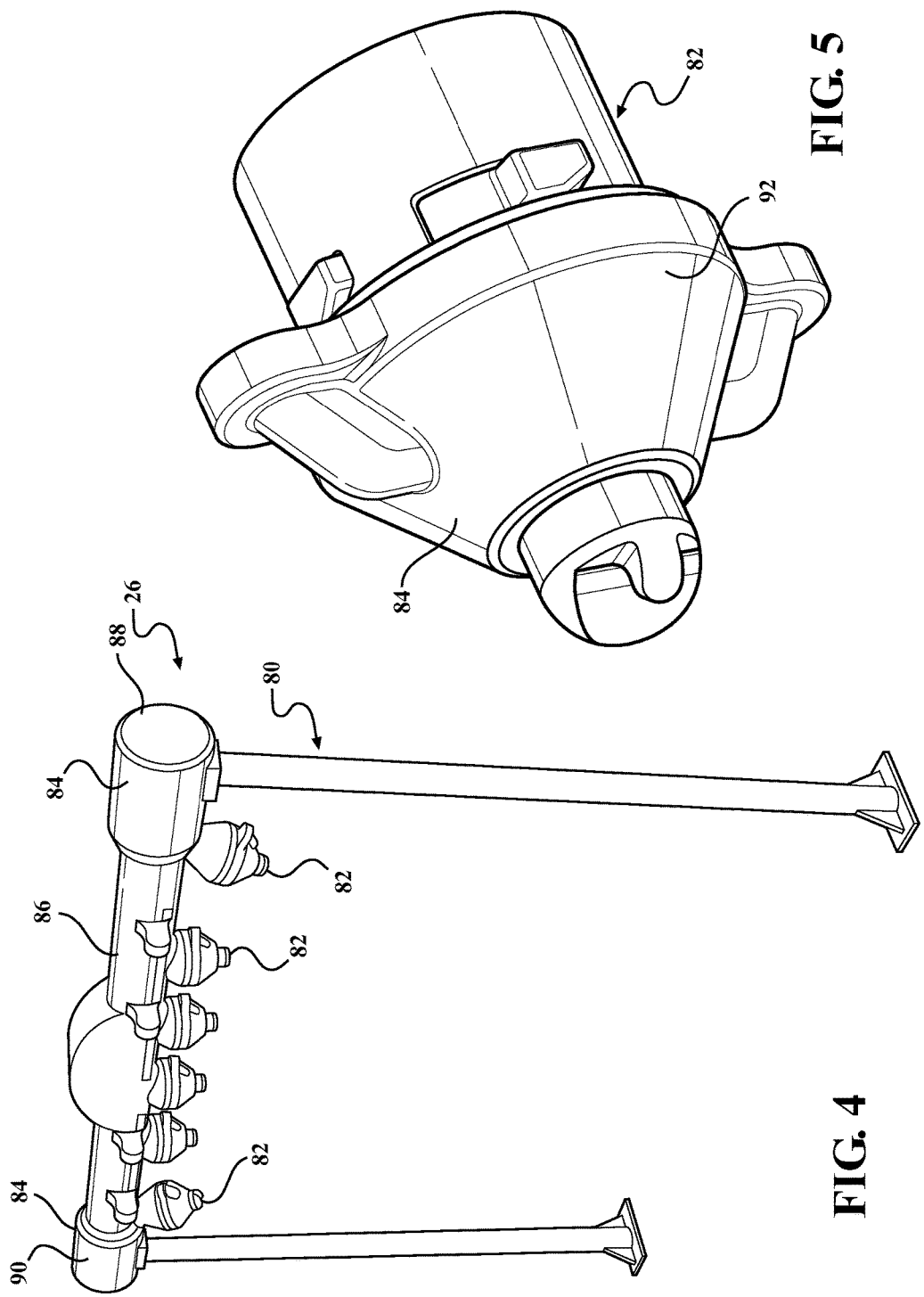

VEHICLE WASH PACKAGE SELECTION CONFIRMATION SYSTEM

CROSS-REFERENCE TO RELATED APPLICATIONS

The present application claims priority to U.S. Provisional Patent Application Ser. No. 62/045,208 entitled "Vehicle Wash Package Confirmation System", filed Sep. 3, 2014, the disclosure of which is hereby incorporated by reference as though set forth fully herein.

TECHNICAL FIELD

The present disclosure relates generally to a vehicle wash system for treating an exterior surface of a vehicle. More specifically, the present disclosure relates to a vehicle wash system for treating an exterior surface of a vehicle that utilizes computer controlled lights to provide feedback confirmation to a customer that the vehicle treatment options selected are being implemented by the wash system.

BACKGROUND OF THE INVENTION

Vehicle wash systems have become a common way for vehicle owners to quickly and efficiently have their vehicles cleaned without having to wash and clean them by hand. Depending upon how dirty the vehicle is, the level of cleanliness the vehicle owner seeks to achieve, and the amount of money the vehicle owner is willing to spend, there are a variety of different types of vehicle wash systems with different service options available to meet those needs. For example, full service vehicle wash systems provide vehicle operators with both interior and exterior vehicle cleaning services. These are generally the most expensive type of vehicle wash systems. Self-service type vehicle wash systems offer vehicle owners a less expensive option for cleaning their vehicles. However, with these types of systems, vehicle owners must operate the equipment themselves to clean the interior and/or exterior of their vehicles. The most common type of vehicle wash systems are those that offer exterior vehicle cleaning services only and which are often embodied as conveyerized tunnel systems or roll over machines. In terms of price, these last types of vehicle wash systems are generally priced in between the other two types of vehicle wash systems.

Each of the above-described vehicle wash systems typically presents vehicle owners with a variety of different cleaning and treatment options and services for varying fees. For example, most vehicle wash systems (whether full service or conventional) generally offer vehicle owners a basic wash package that consists of treating a vehicle exterior with conventional clearing services. This basic wash package is generally provided for a base fee and is often referred to as a regular or base wash. For customers that want additional treatments or services to be performed on their vehicle, many vehicle wash systems offer an upgraded package that includes additional services for payment of an increased fee, such as an under body wash and a tire shine. Other customers may want the "works" and many vehicle wash systems offer a still further upgraded package which includes all of its premium services. The additional services in these upgraded packages, which are often referred to as premium packages, can include an under body rust inhibitor or a tire polish. The premium packages are generally available at a fee that is higher than any of the other packages available.

Once a vehicle owner makes a selection of a desired package and pays the appropriate fee, he relies on the operator of the vehicle wash system to implement the appropriate package that the operator paid for. However, it is not uncommon for a vehicle owner to select and pay for one package and have the wash system provide a different package. This can occur through inadvertent entry of the package selection into the controller by a wash owner/operator or improper intent on the part of the operator of or worker at the vehicle wash system to pocket the difference between the package paid for and that provided.

Additionally, this discrepancy often goes uncorrected as vehicle owners would have a very difficult time noticing this error during the vehicle wash process, even if they know what to look for. This is because the environment within a vehicle wash facility is generally dark with little light and thus visibility for vehicle owners is usually very poor. Couple this with the fact that the vehicle windows are usually covered with soap and water during the vehicle wash process and it is very difficult for vehicle owners to see what components are actually treating their vehicle. As this practice is known to occur and it is difficult to rectify after the fact, some vehicle owners are dissuaded from purchasing packages with additional services for fear that those services will not be provided. This has resulted in a significant loss of revenue for the car wash industry.

It would thus be desirable to provide a method and system that overcomes these disadvantages with existing vehicle wash systems.

SUMMARY OF THE INVENTION

It is therefore an aspect of the present disclosure to provide a vehicle wash system that provides a higher quality wash service for vehicle owners.

It is another aspect of the present disclosure to provide a vehicle wash system that is more attractive to customers and prospective customers.

It is still another aspect of the present disclosure to provide a vehicle wash system that provides a perception of high quality to customers and prospective customers.

It is still a further aspect of the present disclosure to provide a vehicle wash system that provides a more enjoyable vehicle wash experience for customers.

It is yet another aspect of the present disclosure to provide a vehicle wash system that provides visual confirmation to vehicle occupants that the wash system is providing the services they selected and paid for as part of the wash process.

It is still yet another aspect of the present disclosure to provide a vehicle wash system that yields improved aesthetics within a vehicle wash facility.

It is yet a further aspect of the present disclosure to provide a vehicle wash system that provides improved diagnostic information to a vehicle wash operator to facilitate efficient operation of the system.

It is still yet a further aspect of the present disclosure to provide a vehicle wash system that can assist in increased revenue generation.

It is still yet a further aspect of the present disclosure to provide a vehicle wash system that can assist with marketing of the vehicle wash facility.

In accordance with the above and the other aspects of the present disclosure, a method of providing confirmation feedback to a customer of a vehicle wash facility as to purchased vehicle wash services is provided. The vehicle wash facility includes a plurality of vehicle wash components for treating a vehicle exterior in a vehicle treatment area. The customer of the vehicle wash services is presented a plurality of different pre-assigned vehicle treatment packages. Each of the plurality of different vehicle treatment packages is associated with different sets of the plurality of vehicle wash components. Each of the vehicle treatment packages is assigned a different package color. A customer selection of a vehicle treatment package is received and the vehicle wash components associated with the selected vehicle treatment package are automatically employed to treat the customer's vehicle. As the customer's vehicle travels though the vehicle wash facility a plurality of illumination elements disposed adjacent the vehicle treatment area are illuminated for viewing by the customer. The illumination elements emit a color that corresponds to the package color assigned to the vehicle treatment package that is the subject of the first package selection.

In accordance with another aspect, a vehicle wash system for providing a user feedback as to a purchase selection within a vehicle wash facility is provided. The system includes a wash package selection area where a vehicle operator may select a vehicle wash package from among a plurality of different vehicle wash packages. Each of the plurality of different vehicle wash packages corresponding to different wash services for treating a vehicle. Each of the plurality of different vehicle packages is assigned a color identifier so that the vehicle operator can associate the assigned colors with each of the plurality of vehicle wash packages. The system includes at least one illumination source disposed in the vehicle wash facility. The at least one illumination sources has a plurality of different modes corresponding to the plurality of different vehicle packages. A controller is in communication with the at least one illumination source and is configured to detect a selection of one of the plurality of vehicle wash packages from the vehicle operator and direct that the different wash services associated with the selected vehicle wash package are activated as the vehicle passes through the vehicle wash facility. The controller enables the mode of the at least one illumination source corresponding to the selected package such that color is emitted that corresponds to the color identifier assigned to the selected vehicle wash package.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 4 is a perspective view of a foam generation device for a vehicle wash system in accordance with an aspect of the disclosure;

FIG. 5 is a perspective view of a delivery nozzle for the foam generation device of FIG. 4;

DETAILED DESCRIPTION OF THE DISCLOSURE

Figure 1:
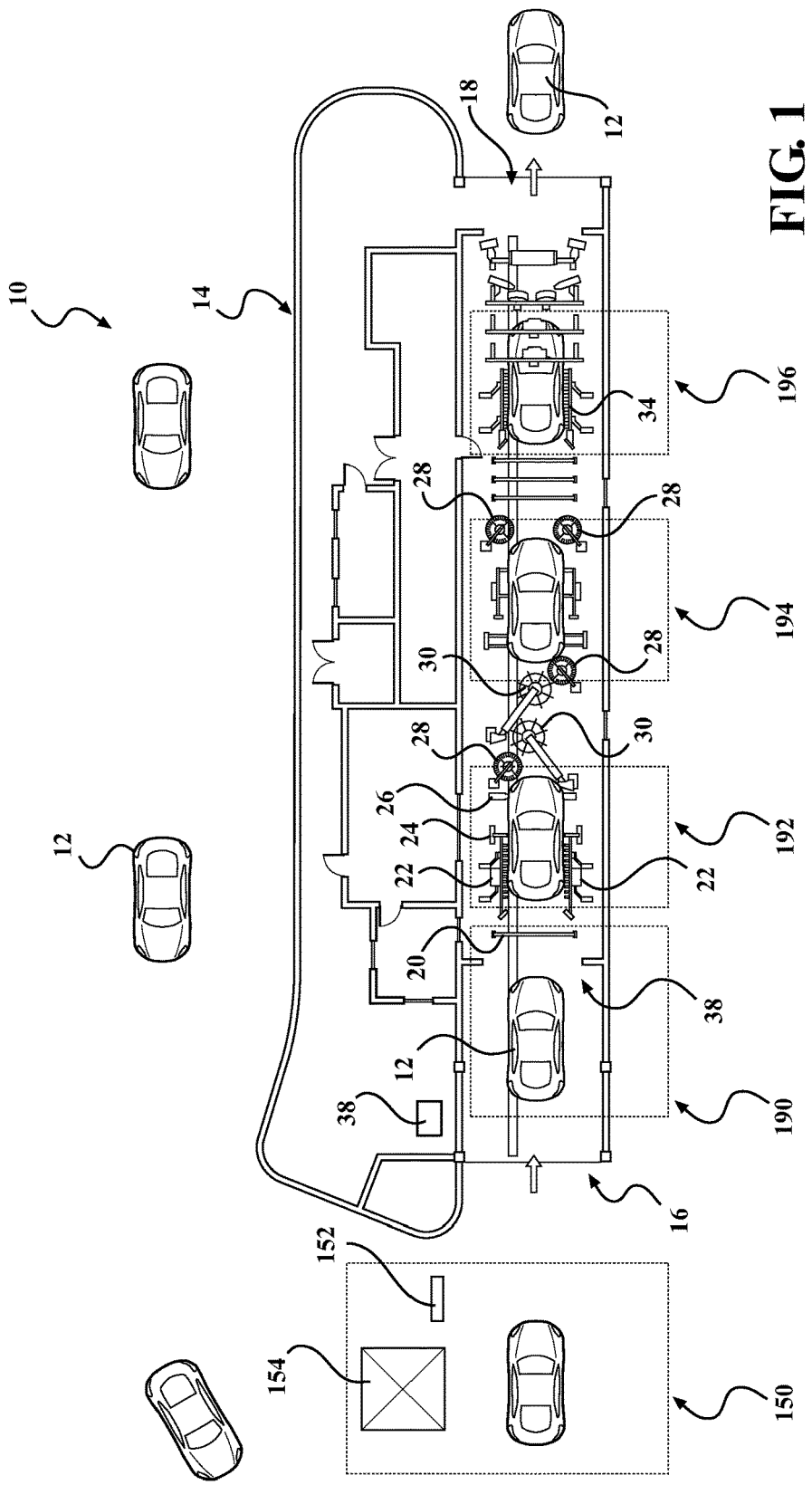
FIG. 1 is a schematic illustration of a vehicle wash system having a plurality of vehicle wash components in accordance with an aspect of the disclosure.

According to an aspect, the present disclosure relates to a vehicle wash system 10. As shown in FIG. 1, the system 10 may be configured as a tunnel car wash, where a vehicle 12 is conveyed through the wash process by a conveyor or the like as is known in the art. Alternatively, the vehicle wash system 10 may be configured as a roll-over type where the vehicle 12 remains stationary and wash components move with respect to the vehicle 12 to perform the vehicle wash process. Other suitable wash processes and systems may also be employed. It will be appreciated that the disclosed system could also be employed in connection with a variety of other vehicle wash systems including, full service, manual or self-serve wash processes.

According to an aspect, the vehicle wash system 10 may be housed within a vehicle wash facility 14 having an entrance end 16 where a vehicle enters and an exit end 18 where the vehicle leaves. According to a further aspect, the vehicle wash system 10 may also include a variety of vehicle wash components that engage and/or treat the exterior of the vehicle 12 as it passes through the vehicle wash facility 14 to effectuate the vehicle wash process. For example, as illustratively shown in FIG. 1, the vehicle wash system 10 can include a rinse arch 20, which sprays water onto the vehicle. The system 10 can also include a pair of wheel scrubbers 22 for cleaning vehicle wheels as well as the lower portion of a vehicle. Additionally, the system 10 may include a top wheel or brush 24 for cleaning an upper exterior surface of a vehicle. Moreover, the system 10 can also include a bubble or foam delivery device 26 that generates bubbles and emits them directly onto the vehicle exterior.

According to another aspect, the system 10 can include one or more side brushes 28 for contacting side exterior surfaces of a vehicle and a plurality of wrap brushes 30 for contacting front and back vehicle surfaces. The system 10 can also include a drying section 32 for removing water from the vehicle exterior. According to a further aspect, the system 10 can include a wheel polishing device 34. It will be appreciated that more, less or different wash components may be employed as part of the vehicle wash system. For example, the system 10 may also include components for treating the vehicle undercarriage, for applying body sealant, for applying polish wax to the vehicle and/or performing a variety of different functions. Additionally, multiples of the same components may be employed as part of the system as desired. Further, the components may take on a variety of different configurations. Moreover, the order, placement and sequence of the components within the system 10 may also vary. According to an aspect, the components may be designed to engage and/or treat the vehicle 12 as it is disposed within a vehicle treatment area 36 of the vehicle wash facility 14.

According to an aspect, the vehicle wash system 10 may include a controller 38 that is in communication with all of the treatment components so that the system 10 may operate automatically under computer control. According to another aspect, the controller 38 may be employed to direct the operation and timing of the vehicle wash components. For example, the controller 38 could signal certain vehicle components to start operating as a vehicle approaches and then signal them to shut down after the vehicle has passed. It will be appreciated that the vehicle wash system 10 could include a variety of sensors or sensing devices to track the location of the vehicles within the system and communicate that information to the controller 38. It will also be appreciated that a computer, processor or other suitable control device may alternatively be employed to control the system and its components. According to further aspect, each of the vehicle wash components, i.e., 20, 22, 24, 26, 28, 30, 32 and 34 utilized in the vehicle wash system 10 can include a light source associated therewith, as discussed in more detail below.

Figure 2:
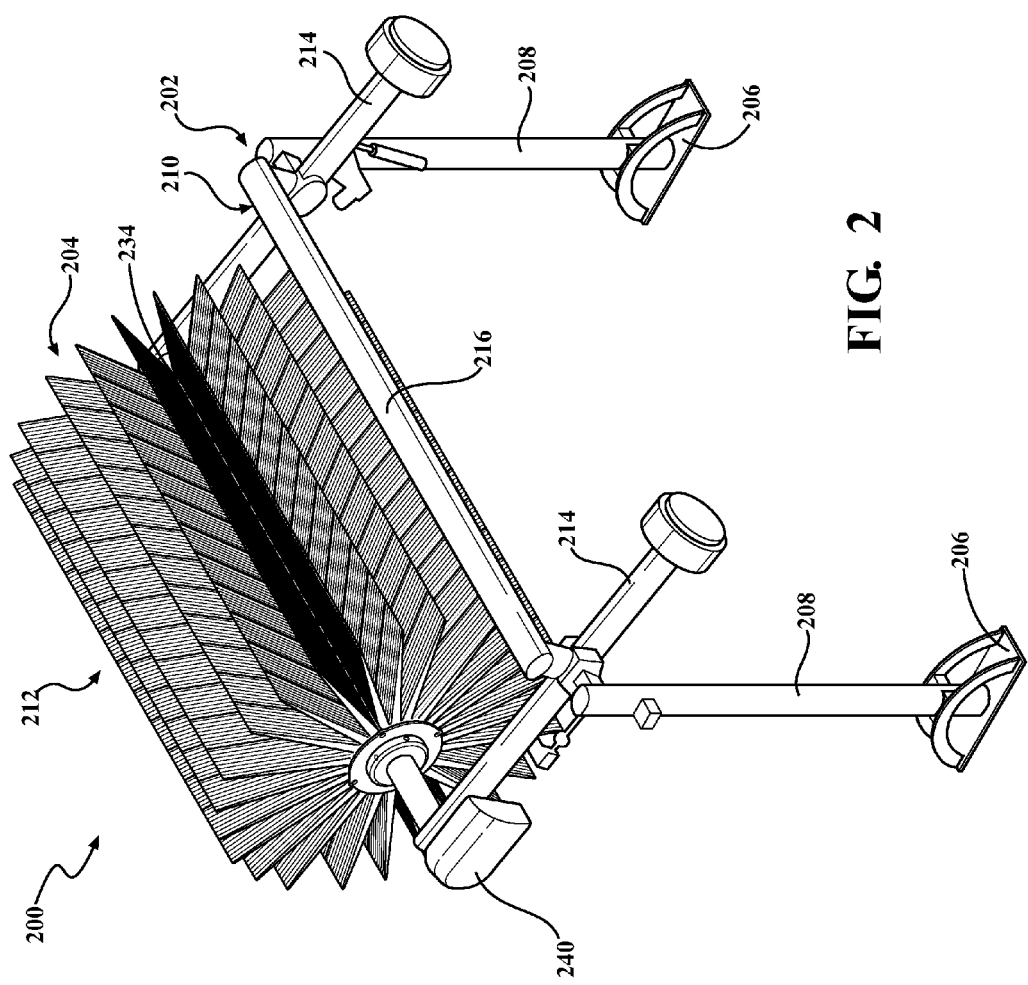
FIG. 2 is a perspective view of a lighted top brush for a vehicle wash system in accordance with an aspect of the disclosure.

FIG. 2 illustrates an exemplary top brush 24 in accordance with an aspect of the present disclosure. The exemplary top brush 24 can include a frame 40 and a brush portion 42 supported by the frame 12. The top brush 24 may be configured to span a vehicle treatment area 36 of a vehicle wash facility 14 for treating a top exterior surface of a vehicle 12. According to an aspect, the top brush 24 may be in communication with a suitable drive mechanism 44, such as a motor, to effectuate rotation thereof in order to perform a scrubbing or cleaning function to remove dirt or debris from the vehicle exterior. It will be appreciated that the disclosed top brush 24 can also perform other functions besides cleaning.

According to an aspect, the top brush 24 can include a rotatable drive shaft 46 in communication with the drive mechanism 44. The top brush 24 may include a plurality of wash media elements 50 coupled to the rotatable drive shaft 46 such that they can rotate therewith. The structure and operation of this exemplary top brush 24 is described in more detail in connection with Applicant's co-pending U.S. patent application Ser. No. 14/456,636, entitled "Lighted Vehicle Wash Component", which was filed Aug. 11, 2014, the disclosure of which is hereby incorporated by reference as though set forth fully herein. It will be appreciated that the top brush 24 may have a variety of different configurations.

According to a further aspect, the top brush 24 can include a plurality of illumination elements 52 disposed thereon. According to one aspect, the illumination elements 52 may be disposed on the frame 40 of the top brush 24. According to another aspect and with reference to FIG. 2, the illumination elements 52 may be disposed in an area between adjacent rows of wash media elements 50 such that the illumination elements 52 rotate as the top brush 24 rotates and may be visible from the exterior while it is rotating and while sit is at rest. It will be appreciated that only one or multiple illumination elements 52 may be incorporated into the top brush 24. According to an aspect, the illumination elements 52 may be individual LED light strips, each including a plurality of individual LEDs. According to another aspect, a variety of other suitable illumination elements may be employed. It will also be appreciated that the illumination elements may be disposed in a variety of suitable locations. According to a further aspect, the illumination elements 52 may be located in multiple different locations on the top brush 24.

Figure 3:
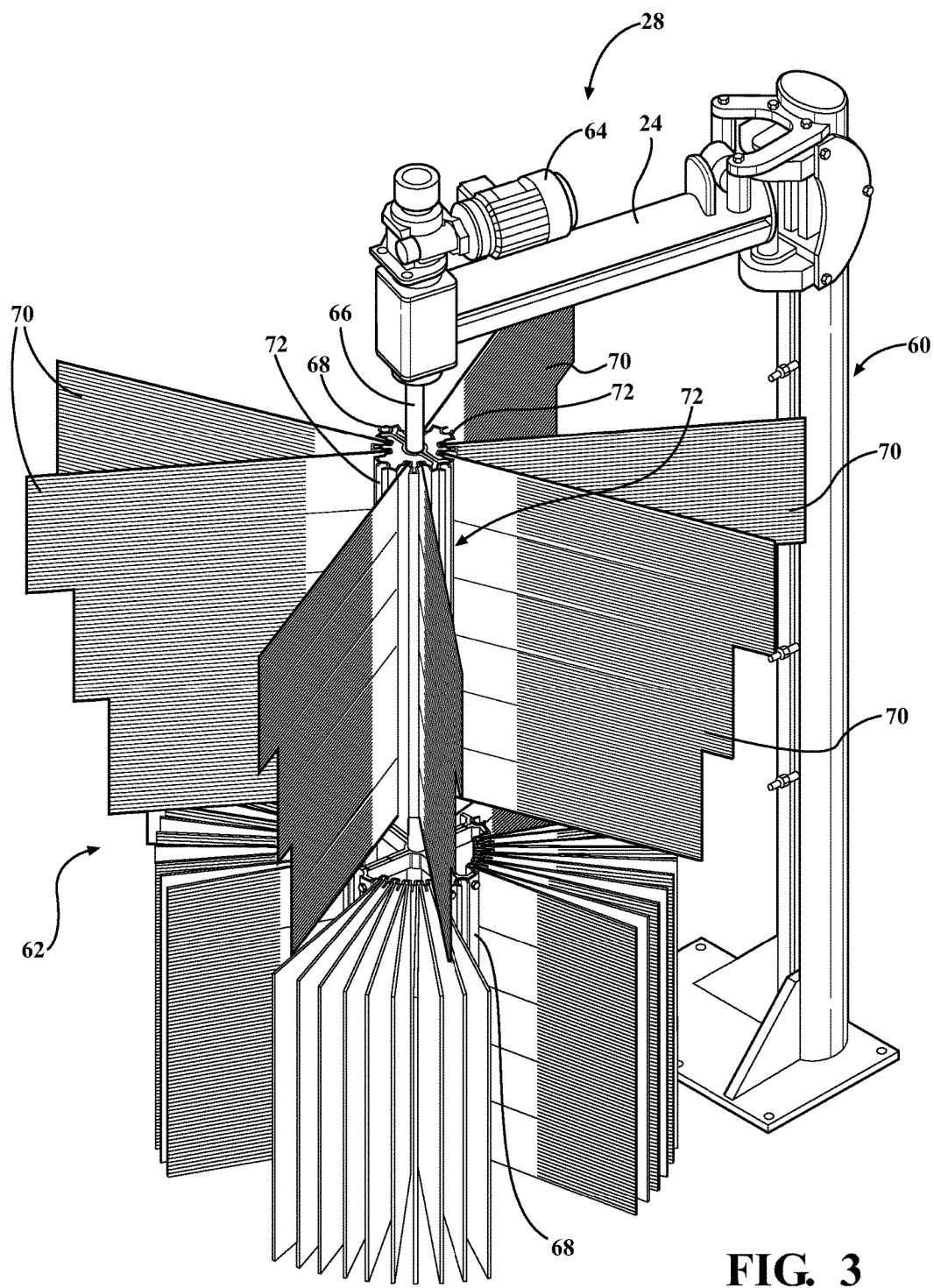
FIG. 3 is a perspective view of a lighted side brush for a vehicle wash system in accordance with an aspect of the disclosure.

FIG. 3 illustrates an exemplary side brush 28 in accordance with an aspect of the present disclosure. The exemplary side brush 28 can include a frame 60 and a brush portion 62 supported by the frame 60. The side brush 28 may be configured to be disposed adjacent a vehicle treatment area 36 of a vehicle wash facility 14 for treating side exterior surfaces of a vehicle 12. According to an aspect, the side brush 28 may be in communication with a suitable drive mechanism 64, such as a motor, to effectuate rotation thereof in order to perform a scrubbing or cleaning function such as to remove dirt or debris from a vehicle exterior. It will be appreciated that the disclosed side brush 28 can also perform other functions besides cleaning. It will also be appreciated that side brushes may be disposed on either side of the vehicle treatment area 36 for contacting either side of the vehicle.

According to an aspect, the side brush 28 can include a rotatable drive shaft 66 in communication with the drive mechanism 64. A plurality of hub portions 68 may be in communication with the drive shaft 66. The hub portions 68 may each have a plurality of wash media elements 70 secured thereto such that they rotate together with the rotatable drive shaft 66. The structure and operation of this exemplary side brush 28 is described in more detail in connection with Applicant's co-pending U.S. patent application Ser. No. 14/474,817, entitled "Lighted Vehicle Wash Component", which was filed on Sep. 2, 2014, the disclosure of which is hereby incorporated by reference as though set forth fully herein. It will be appreciated that the side brush 28 may have a variety of different configurations.

According to a further aspect, the side brush 28 can include a plurality of illumination elements 72 disposed thereon. According to one aspect, the illumination elements 72 may be disposed on the frame 60 of the side brush 28. According to another aspect and with reference to FIG. 3, the illumination elements 72 may be disposed in an area between adjacent rows of wash media elements 70 such that the illumination elements 72 may be visible from the exterior of the side brush 28 while it is rotating and while it is at rest. It will be appreciated that only one or multiple illumination elements 72 may be incorporated into the side brush 28. According to an aspect, the illumination elements 72 may be individual LED light strips, each including a plurality of individual LEDs. According to another aspect, a variety of other suitable illumination elements may be employed. It will also be appreciated that the illumination elements may be disposed in a variety of suitable locations. According to a further aspect, the illumination elements 72 may be located in multiple different locations on the side brush 28.

FIG. 4 illustrates an exemplary bubble or foam delivery device 26 in accordance with an aspect of the present disclosure. The exemplary bubble or foam delivery device 26 can include a frame 80 and a plurality of nozzle portions 82 supported on the frame 80. The bubble or foam delivery device 26 may be configured to span a vehicle treatment area 36 of a vehicle wash facility 14 for emitting fluid onto a top exterior surface of a vehicle 12. It will be appreciated that the disclosed bubble or foam delivery device 26 can be configured to emit a variety of different types and/or kinds of fluids, i.e., the device can emit bubbles instead of foam. An exemplary bubble delivery device 26 that may be employed with the disclosed system is disclosed in Applicant's co-pending U.S. patent application Ser. No. 13/864,813, entitled "A Vehicle Wash Component for Emitting Bubbles", filed Apr. 17, 2013, the disclosure of which is hereby incorporated by reference. It will be appreciated that a variety of other suitably configured devices may be employed.

According to an aspect, the bubble or foam delivery device 26 may include a plurality of illumination elements 84 that are in communication with the device 26. According to an aspect, the illumination elements 84 may be disposed on the outside of the frame 80 such as by various suitable securing means as will be understood by one of ordinary skill in the art. According to another aspect, the frame 80 may have a manifold housing 86 with a pair of end portions 88, 90. The manifold housing 86 associated with one or both of the end portions 88, 90 could be constructed of a translucent material and one or more illumination elements 84 could be incorporated into the housing 86 such that end portions 88, 90 could light up when the illumination elements are activated. A variety of different types of materials with different characteristics could be employed to achieve this lighting effect. For example, the end portions could be constructed of an opaque material. It will be appreciated that more portions than the end portions 88, 90 of the manifold housing 86 could be configured to light up as desired. In fact, part of the manifold housing 86 could be configured as a light pipe such that illumination elements 84 could be placed on one end and the light pipe could convey light to other portions of the housing. According to an aspect, the illumination elements 84 may be one or more LEDs that are configured to illuminate the end portions 88, 90. According to another aspect, a variety of other suitable types of illumination elements may be employed.

According to another aspect and as best shown in FIG. 5, each of the plurality of nozzle portions 82 could include a cap portion 92 that may be constructed of a translucent material. According to a further aspect, an illumination element 84 may be disposed within the interior of each of the nozzle portions 82 to illuminate the cap portions 92 as desired. According to an aspect, the illumination elements 84 may be one or more LEDs that are configured to illuminate the cap portions 92. According to another aspect, a variety of other suitable types of illumination elements may be employed. The cap portions 92 could be configured to light up in unison with the end portions 88, 90. It will be appreciated that the illumination elements 84 could have a variety of different configurations and could be disposed and integrated into the device 26 in a variety of suitable ways, including in multiple different locations.

It will be appreciated that illumination elements may be incorporated into other components in the vehicle wash system that have not been specifically described and may be incorporated in similar fashions, as described above. It will also be appreciated that illumination elements could be associated with other portions of the vehicle wash system other than the components. The illumination elements could also be associated with other portions of the vehicle wash facility.

Figure 6:
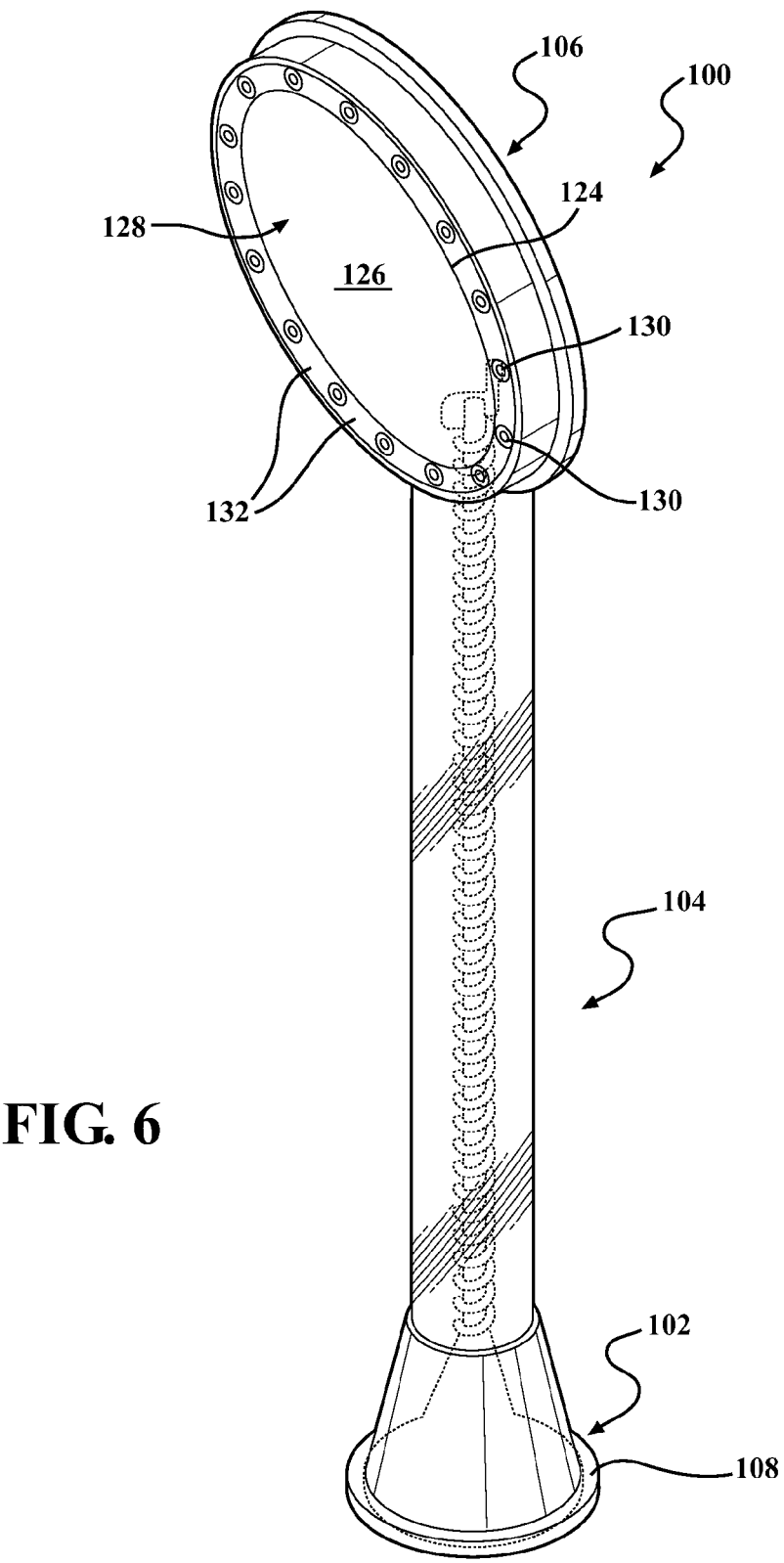
FIG. 6 is a perspective view of an illuminated sign for a vehicle wash system in accordance with an aspect of the disclosure.

FIG. 6 illustrates a lighted sign component 100 for use in connection with a vehicle wash system 10 according to an aspect of the present disclosure. According to an aspect, the lighted sign component 100 can include a base portion 102, a mounting portion 104, and a display portion 106. According to an aspect, the base portion 102 may have a flat baseplate portion 108 for engaging a flat structure such as ground of a vehicle wash facility. It will be appreciated that the baseplate portion 108 could be configured to engage a variety of other suitable structures. It will also be appreciated that the lighted sign component 100 could be located in a variety of suitable locations throughout the vehicle wash facility. It will also be appreciated that the baseplate portion 108 could have a variety of different configurations.

According to another aspect, the mounting portion 104 may be configured as a vertical post that may extend generally between the base portion 102 and the display portion 106. According to aspect, the mounting portion 104 may include a signpost portion 110 and a cover portion 112 that may be disposed over the signpost portion 110. According to an aspect, the cover portion 112 may be constructed of a translucent material. It will be appreciated that the cover portion 112 could be constructed of a variety of other suitable materials. According to a further aspect, an illumination element 114 may be in communication with the signpost portion 110 such that light may be emitted through the cover portion 112 and may be visible from the exterior of the component 100. The illumination element 114 may be configured as a flexible LED strip that is wrapped around the signpost portion 110. It will be appreciated that a variety of other types of suitable illumination elements may be employed and that they may be mounted or disposed within the mounting portion 104 in a variety of suitable ways. It will also be appreciated that the mounting portion 104 could have a variety of different configurations. It will be further appreciated that the illumination elements could be disposed in a variety of other locations on the component 100.

According to a further aspect, the display portion 106 may be pivotally connected to an upper end of the mounting portion 104. As shown, the display portion 106 may have a generally circular shape with an outer peripheral portion 124 and a middle section 126. According to an aspect, the middle section 126 may be constructed of a translucent material such as a translucent plastic material and may be configured to emit light. It will be appreciated that the middle section 126 could be constructed of an opaque material that is configured to glow. According to another aspect, the middle section 126 may be configured to display lighted indicia, such as signage information 128. This may be accomplished by one or more illumination elements disposed behind the middle section 126 as will be understood by one of ordinary skill in the art. This signage information 128 could be configured as navigational information that is conveyed to a vehicle occupant, including that it is clear for the vehicle to drive forward or that the vehicle needs to stop. The signage information 128 could also be configured as promotional information about services the vehicle wash facility has available for the vehicle, such as the various wash packages. It will be appreciated that the signage information 128 could be configured and utilized to convey a variety of other suitable information.

According to yet another aspect, the outer peripheral portion 124 may include individual illumination elements 130 uniformly dispersed therearound to provide additional light that may be emitted from the component 100. The illumination elements 130 may be individual LEDs. However, a variety of other suitable light sources may be employed. A plurality of sections 132 may be included between the illumination elements 130 that may also be constructed of translucent material. It will be appreciated that the outer peripheral portion 124, the illumination elements 130, and the sections 132 may all be colored with the same light at the same time. Alternatively, each portion may be colored with different lights. It will also be appreciated that some or all of the illumination elements may be configured to flash or blink.

According to an aspect, the system 10 may be configured to illuminate certain of the treatment components within the facility in selected areas upon certain predetermined conditions. According to one exemplary aspect, the system 10 may be configured to illuminate certain of the treatment components and/or illumination elements located within the vehicle wash facility to provide a vehicle occupant with feedback and confirmation that the wash package that they selected is actually being performed on their vehicle.

Figure 7:
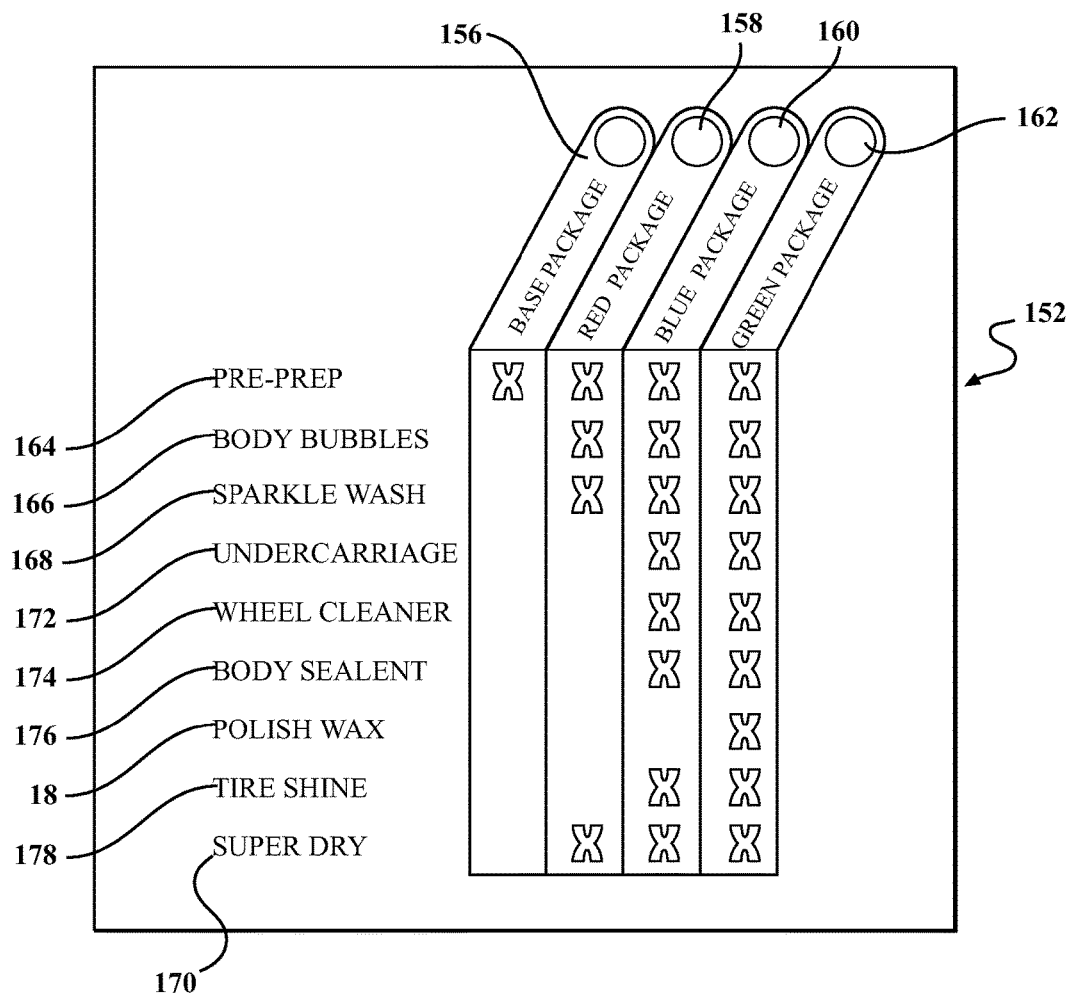
FIG. 7 is an exemplary package menu sign for a vehicle wash system in accordance with an aspect of the disclosure.

In accordance with a method and system of the present disclosure, when a vehicle arrives at the vehicle wash facility, the vehicle can encounter a package purchase zone 150 where a vehicle operator is presented with various treatment packages and associated prices for treatment of the vehicle. The various treatment options may be presented to the vehicle occupant in a variety of different ways. According to one aspect, they may be presented to the vehicle occupant on a display screen, a menu board, or a variety of other suitable ways. An exemplary menu board is schematically depicted in FIG. 7 as reference number 152. Once the vehicle operator has decided which vehicle treatment package to purchase, they may indicate their package selection in a variety of different ways. According to one aspect, the vehicle operator may stop at an operator station, generally designated by reference number 154, and convey their package selection to an operator who will manually input that selection into a computer or controller to start the process. According to another aspect, the vehicle operator may enter their selection electronically such as on an electronic terminal that also allows for electronic selection and payment at that terminal. Once their selection is input, the controller 38 can track that operator's vehicle as it travels throughout the wash process and can direct that the services associated with the package selected by the operator be performed.

With reference to FIG. 7, the disclosed vehicle wash system 10 can offer various treatment packages that are identified by different identifiers and each have different services associated therewith. As discussed above, these may be presented on a menu board or display. According to an aspect, the primary identifier associated with the various treatment packages of the present disclosure may be a color. For example, with reference to FIG. 11, the Base package, as generally indicated by reference number 156, may be identified as the White package and may be designated by the color white or no color. The Red package, which includes additional wash services over the Base package, is generally indicated by reference number 158, and may be designated by the color red. The Blue package, which includes additional wash services over and above the White package and the Red package, is generally identified by reference number 160, and may be designated by the color blue. The Green package, which can include the most wash services of the various packages available, is generally identified by reference number 162, and may be designated by the color green. It will be appreciated that more or less packages may be presented to vehicle occupants. It will also be appreciated that the various packages can be assigned any color or any other identifier.

According to an aspect and with continued reference to FIG. 11, the services offered with the Base package are a standard wash and may include a pre-prep service, which is generally by reference number 164. According to another aspect, with the Red package the vehicle occupant can also get the pre-prep wash 164 along with additional services, including body bubbles, identified generally by reference number 166, sparkle wash, generally identified by reference number 168, and super dry, generally identified by reference number 170. As will be appreciated, the vehicle occupant may elect to purchase the Red package for an additional fee over and above the fee for Base package.

Further, with the Blue package, the vehicle occupant may receive additional services in addition to those offered with the Red package, including undercarriage cleaning, generally identified by reference number 172, wheel cleaning services, generally identified by reference number 174, body sealant, generally identified by reference number 176, and tire shine services, generally identified by reference number 178. According to an aspect, the vehicle occupant may purchase the Blue package for a fee that is greater than the Red package.

According to a further aspect, the Green package offers the vehicle occupant the most services. According to an aspect, the Green packages can offer the vehicle occupant all the same services available with the Red package as well as an additional polish wax service, generally identified by reference number 180.

According to an aspect, once the vehicle occupant has selected the color package option and that selection has been entered into and recognized by the computer system, the vehicle wash system 10 can be coordinated such that the color of the illumination elements associated with the various treatment components matches the color of the vehicle owner's selected package. In other words, the colors emitted from the light sources may be coordinated with a customer's package purchase. According to an aspect, the controller 38 could also be in communication with the illumination elements to control their operation and match their color to the color assigned to the selected package option. For example, the controller 38 may operate all the illumination elements in accordance with a DMX protocol. According to another aspect, a separate DMX controller could be utilized to control the lighting of the illumination elements. The DMX controller could be employed as a laptop. The DMX controller could also include software that allows the controller to accomplish the functionality described herein. The DMX controller could take on a variety of other configurations.

According to an aspect, after the vehicle occupant's package selection purchase has been entered into the system, the vehicle can proceed through the entrance end 16 of the vehicle wash facility 14. According to an aspect, the controller 38 together with the sensors and other devices can track the location of the vehicle within the wash system 10. According to a further aspect, the vehicle 12 can travel to a first vehicle zone 190. According to an aspect, the lights on all of the components in and adjacent the first vehicle zone 190 can be illuminated with a color that matches the package selection by the vehicle occupant. Thus, if the vehicle occupant selected the "Blue" package, the illumination elements of all of the components in or adjacent the first vehicle zone 190 can emit a blue light as controlled by the controller 38 to provide visual confirmation to the vehicle occupant that they are getting the proper vehicle treatment services that they selected and paid for. It will be appreciated that the illumination elements can be associated with the first vehicle zone 190 in other ways other than with the components, including signs and displays.

According to another aspect, as the vehicle 12 proceeds into a second vehicle zone 192, the illumination elements of the components in the second vehicle zone 192 may be illuminated in the color blue to match that of the vehicle occupant's blue package selection. According to another aspect, as the vehicle 12 proceeds into a third vehicle zone 194, the controller 38 can direct the illumination elements on the components in the third vehicle zone 194 to emit a color matching the vehicle occupant's section, which according to this example is blue. According to a still further aspect, as the vehicle 12 proceeds into a fourth vehicle zone 196, the illumination elements of the components in the fourth vehicle zone 196 may be illuminated in a color to match that of the vehicle occupant's package selection as directed by the controller 38. It will be appreciated that the vehicle wash system 10 could be divided or broken down into more or less zones. It will also be appreciated that fewer than all of the components in a particular zone could be directed to emit light in a color matching that of the vehicle occupant's selection. It will also be appreciated that the illumination elements need not be associated with the component, but could otherwise be associated with the various vehicle zones.

According to another aspect, the controller 38 may control the lighting of the components within the vehicle wash system 10 to handle multiple vehicles within the wash system 10 at a given time at least two of which may have selected different packages. For example, a first vehicle occupant could enter the package purchase zone 150 and select the Red colored package. After the fee is paid for this package, it could be entered into the system and recognized by the controller 38. As the first vehicle proceeds toward the first vehicle zone 190, the illumination elements associated with the first vehicle zone 190 can be colored red to match that vehicle's package selection. According to an aspect as the first vehicle enters the first vehicle zone 190, a second vehicle can enter the package purchase zone 150.

In this example, the second vehicle 12 may select to have the Green package option for treatment of their vehicle. Again, after payment is received, this can be entered into the system and recognized by the controller 38. As the first vehicle proceeds into the second vehicle zone 192, the illumination elements in that zone can be colored red to correspond to the package selection of the first vehicle. At the same time, the controller 38 can direct that the illumination elements in the first vehicle zone 190 be colored green so that they match the color of the package selection made by the second vehicle which has just entered the first vehicle zone 190. With the first vehicle in the second vehicle zone 192 and the second vehicle in the first vehicle zone 190, a third vehicle can enter the package purchase zone 150 and select a package option for treatment of their vehicle. According to this example, the third vehicle can select a Blue package.

According to this example, as the first vehicle 12 moves to the third vehicle zone 194, the illumination elements associated with that zone can be colored red to match the package selection made by the vehicle occupant. Also, as the second vehicle 12 moves to the second vehicle zone 192, the illumination elements associated with that zone can now be colored green to correspond to the package selection made by the second vehicle occupant. Additionally, as the third vehicle 12 moves into the first vehicle zone 190, the illumination elements associated with that zone can be colored blue to match that vehicle's package selection.

Continuing further with this example, as the first vehicle moves to the fourth vehicle zone 196, the illumination elements associated with that zone may be colored red to match that vehicle's package selection. As the second vehicle 12 moves to the third vehicle zone 194, the illumination elements associated with that zone can now be colored green to correspond to this vehicle's package selection. Also, as the third vehicle 12 moves to the second vehicle zone 192, the illumination elements associated with that zone can now be colored blue.

As the first vehicle 12 leaves the vehicle wash system 10 through the exit end 18, the second vehicle can move into the fourth vehicle zone 196. As the second vehicle moves into the fourth vehicle zone 196, the illumination elements associated with that zone can be colored green as directed by the controller 38. At the same time, the third vehicle can then move into the third vehicle zone 194 where the illumination elements can be colored blue. As the second vehicle exits the facility through the exit end 18, the third vehicle 12 can move to the fourth vehicle zone 196 where the illumination elements can be colored blue. The third vehicle can then also leave out of the exit end 18. It will be appreciated that the system 10 could be employed with more or less vehicles which have selected the same or different packages.

According to another aspect, the lighting system could be configured so that the light sources emit colors for useful proposes as opposed to for primarily aesthetic purposes. According to another aspect, the light sources could be programmed to emit colors for navigation purposes, such as red when a vehicle operator should stop and green when it is clear for the vehicle to proceed. According to a further aspect, the light sources could employ the RGB color model, where red, green, and blue light are added together in various ways to reproduce a broad array of colors, as is known.

According to an aspect, the light sources on several of the rotary components, such as the components in a particular vehicle zone, may be configured to separately emit lights of different colors sequentially. According to another aspect, the light sources may each be in communication with the controller 38 so that they may be programmed to emit the same color from each of the components in synchronization or unison. According to another aspect, the controller 38 could be programmed to emit colors in a particular pattern or sequence. For example, the following color sequence could be emitted from each component: blue, followed by red, followed by green, followed by yellow. It will be appreciated that different colors could be emitted from the components in different orders. For example, if the RGB color sequence is employed, an infinite number of colors could be created and emitted from the light sources in a controlled fashion. According to an aspect, controlling light sources such that colored lights from various components are emitted in unison or simultaneous provides significant aesthetic benefits. This is compared to each illumination element being controlled individually where they are not in unison, which can be very distracting.

It will also be appreciated that various combinations of colors or even multiple colors could be emitted from each component at the same time. According to a still further aspect, the controller 38 could be configured to emit different colors from each of the components at the same time. It will be appreciated that any sequence, order or placement of colors may be employed. According to an aspect, emitting different colors from the light sources in a controlled pattern is considered far more attractive then emitting the colors in a random fashion.

According to an aspect of the disclosure, the controller 38 could be configured to vary the pattern of colors utilized within the system at a predetermined time. For example, the controller 38 could be emitted to vary the pattern based on a time trigger, i.e., the pattern could change every hour. According to an aspect, the controller could be configured to change the pattern based on another event, such as the location of a vehicle. The controller 38 could be configured to switch from one pattern to another based on a variety of different events or triggers. According to a further aspect, the controller 38 could be configured to switch from one controlled pattern to another pattern randomly.

In addition to colored patterns, the controller 38 could be configured to create other effects with the lights, including flashing the lights in a pattern. The lights could also be dimmed or have a variety of other effects.

According to yet another aspect, one or more bubble light sources could be disposed adjacent the bubble device 26 to project light onto the bubbles emitted therefrom. Again, these bubble light sources could be configured to emit light in a multitude of different colors. It will be appreciated that the bubble light sources could also be in communication with the controller 38 such that these bubble light sources could be synchronized with the light sources associated with the other components such that they all emit the same color at the same time. Again, according to another aspect, the bubble light sources could be configured to emit different colors than those emitted from the other components at the same or different times. Again, the bubble light sources and the component light sources could be configured to emit colors in any respective combination.

According to another aspect, the system may be configured to illuminate the lighting elements on certain of the treatment components and/or within the facility upon other predetermined conditions being met or determined. For example, the controller 38 may be in communication with various input sources, such as motion sensors or the like, to determine whether or not any vehicles are located in the vehicle treatment area, in a treatment zone, or may be approaching the vehicle treatment area. It will be appreciated that the controller may receive inputs from a variety of different sources to assist with the determination of whether or not vehicles are in or approaching the vehicle treatment area or a treatment zone.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A vehicle wash system located within a vehicle wash facility, said system providing a vehicle operator feedback as to a purchase selection and said system comprising:
   a wash package selection area wherein a vehicle operator selects a vehicle wash package from among a plurality of different vehicle wash packages, each of said different vehicle wash packages corresponding to different wash services for treating a vehicle;
   a specific unique color identifier assigned to each of said plurality of different vehicle wash packages and visible to a vehicle operator, thereby allowing for association of each of said specific unique color identifiers with each of said plurality of vehicle wash packages;
   at least one illumination source disposed in said vehicle wash facility and having a plurality of different modes, each mode corresponding to one of said plurality of different vehicle wash packages; and
   a controller in communication with said at least one illumination source;
   said controller detecting a selection of one of said plurality of vehicle wash packages by a vehicle operator;
   said controller activating said different wash services associated with said detected selected vehicle wash package as the vehicle passes through said vehicle wash facility; and
   said controller activating said mode of said at least one illumination source corresponding to said selected package and said at least one illumination source emitting said specific unique color identifier assigned to said detected selected vehicle wash package.

2. The system of claim 1, further comprising:
   a display disposed in said wash package selection area, said display presenting said plurality of different vehicle wash packages and their assigned specific unique color identifier to the vehicle operator.

3. The system of claim 2, wherein said display is an electronic display.

4. The system of claim 2, wherein said plurality of different vehicle wash packages include an economy package, a standard package, and a premium package.

5. The system of claim 1, further comprising:
   an input device associated with said wash package selection area, said input device allowing a vehicle operator to input a selection of one of said plurality of different vehicle wash packages and sending a signal to said controller indicative of said selection.

6. The system of claim 5, wherein said input device is a mobile device.

7. The system of claim 1, further comprising:
   a plurality of vehicle treatment zones disposed within said vehicle wash facility, each of said plurality of vehicle treatment zones being associated with one or more of said different wash services that are a part of said plurality of different vehicle wash packages;
   at least one illumination source disposed in each of said plurality of vehicle treatment zones with each of said at least one illumination sources having a plurality of different modes each corresponding to one of said plurality of different vehicle wash packages.

8. The system of claim 7, wherein said controller is further configured to detect multiple selected vehicle wash packages each associated with a different vehicle operator for treatment of their respective vehicles.

9. The system of claim 8, further including:
a plurality of sensing devices disposed with vehicle wash facility, said sensing devices detecting location information about one or more vehicles located within said facility; and
each of said plurality of sensing devices configured to communicate with said controller to transmit said detected location information about said vehicles to said controller.

10. The system of claim 9, wherein said controller is further configured to detect in which of said plurality of vehicle treatment zones each of said vehicles is located and to activate said mode of said at least one illumination source in that vehicle treatment area with said mode corresponding to said selected package of vehicle located in that vehicle treatment zone such that said color identifier emitted in each of said plurality of zones corresponds to said specific unique color identifier assigned to said selected vehicle wash package for said vehicle in that zone.

11. The system of claim 10, further comprising a plurality of illumination sources associated with each of said plurality of vehicle treatment zones.

12. The system of claim 11, wherein said plurality of illumination sources consist of LED light sources.

13. The system of claim 10, wherein said specific unique color identifiers assigned to said plurality of different vehicle wash packages are selected from one or more of the following: red, blue, green, and white.

14. The system of claim 10, wherein said at least one illumination source in at least one of said plurality of vehicle treatment zones is disposed on a vehicle wash component.

15. The system of claim 14, wherein said vehicle wash component is selected from one or more of the following: a side brush, a top brush, a wrap brush, a wheel cleaner, a rinse arch, a foam generation device, a dryer.

16. A vehicle wash system, comprising:
a wash package selection zone, including a display, said display presenting a plurality of different vehicle wash packages each offering different levels of vehicle wash services for treating a vehicle, each of said plurality of vehicle wash packages being associated on said display with a different color identifier;
a controller configured to detect a selection by a vehicle operator of one of said plurality of vehicle wash packages;
at least one vehicle treatment zone defined in a vehicle treatment area wherein at least some of said vehicle wash services corresponding to said selected package are performed on said vehicle, said vehicle treatment zone including at least one illumination element associated therewith, said at least one illumination element having a plurality of different color modes with each of said plurality of color modes corresponding to one of said different color identifiers associated with each of said plurality of vehicle wash packages;
said controller communicating with said at least one illumination element and activating one of said plurality of different color modes based on a detected selected vehicle wash package and said color identifier associated with said selected vehicle wash package;
said at least one illumination element configured based on said activated color mode to emit a light that corresponds in color to said color identifier associated with said selected vehicle wash package; and
wherein said at least one illumination element is disposed in said at least one vehicle treatment zone such that said light emitted therefrom is visible to a vehicle operator while in said vehicle treatment zone.

17. The system of claim 16, further comprising:
a plurality of vehicle treatment zones disposed along a length of said vehicle treatment area, each of said plurality of vehicle treatment zones having at least one illumination element associated therewith and each of said illumination elements having a plurality of different color modes with each of said color modes corresponding to one of said different color identifiers associated with each of said plurality of vehicle wash packages.

18. The system of claim 17, wherein said controller is further configured to:
detect multiple selected vehicle wash packages with each selected vehicle wash package being associated with a different vehicle;
detect in which of said plurality of treatment zones along said treatment area each of said vehicles is located;
based on said detected location of each of said different vehicles and said detected selected vehicle wash package associated therewith, said controller activating said color mode corresponding to said color identifier associated with said selected wash packages of said at least one illumination element in each of said treatment zones in which one of said different vehicles is located; and
whereby said at least one illumination element in each of said plurality of treatment zones wherein a vehicle is located emits a color corresponding to said selected vehicle wash package of that vehicle.

19. The system of claim 18, wherein said at least one illumination element associated with each vehicle treatment zone is disposed on a vehicle treatment component.

20. The system of claim 17, further comprising:
a plurality of illumination elements associated with each of said plurality of vehicle treatment zones.

21. The system of claim 19, wherein said vehicle treatment component is selected from the group consisting of: a top brush, a side brush, and a foam generator.

22. The system of claim 21, wherein said at least one illumination element is disposed adjacent a hub of one of said vehicle treatment components and rotates as said component hub rotates.

23. The system of claim 16, wherein said at least one illumination element is disposed within a sign element disposed adjacent a vehicle treatment area.

24. The system of claim 16, wherein said at least illumination element consists of one or more LED sources.

25. The system of claim 16, wherein said display is a computer screen, said screen including a listing of said plurality of different vehicle wash packages.

26. The system of claim 16, wherein said different color identifiers are selected from one or more of the following colors: red, blue, green and white.

27. The system of claim 26, wherein said controller is configured to employ DMX protocol.

28. The system of claim 16, wherein said vehicle operator may communicate said selected vehicle wash package to said controller by a mobile device.

29. A vehicle wash system, comprising:
a display area wherein a vehicle operator is presented with a plurality of different vehicle wash packages, including a base package and a premium package each offering different levels of vehicle wash services for a vehicle;

wherein in said display area a different color is associated with each of said plurality of different vehicle wash packages;

a vehicle treatment area where a vehicle is subjected to vehicle wash services, said vehicle treatment area, including a plurality of vehicle treatment zones;

a controller configured to detect a first selection of one of said different vehicle wash packages and a second selection of one of said different vehicle wash packages, said controller further including a vehicle location detection module for determining a location of one or more vehicles with respect said plurality vehicle treatment zones and to associate said first and said second selected vehicle wash package with a respective vehicle;

at least one illumination element disposed in each of said plurality of vehicle treatment zones, each of said at least one illumination elements having a plurality of different modes, with each of said modes corresponding to one of said different colors associated with each of said plurality of vehicle wash packages;

each of said at least one illumination elements in communication with said controller, whereby said controller is configured to activate one of said plurality of different modes, with said activated mode corresponding to said selected vehicle wash package when said respective vehicle is determined by said controller to be in said vehicle treatment zone associated with said at least one illumination element; and said at least one illumination element configured based on said activated mode to emit a light in said color that corresponds to said color of said selected vehicle wash package.

30. The system of claim 29, wherein said first and second selections are different vehicle wash packages.

31. The system of claim 29, further comprising:
one or more sensors configured to communicate with said vehicle location detection module for providing location information about vehicles in each of said vehicle treatment zones.

32. The system of claim 29, further comprising:
a plurality of illumination elements associated with each of said plurality of vehicle treatment zones.

33. The system of claim 32, wherein said plurality of illumination elements are configured as LED light sources.

34. The system of claim 32, wherein one or more of said plurality of illumination elements is disposed on a vehicle treatment component.

35. The system of claim 34, wherein said one or more illumination elements on said vehicle treatment component are located adjacent a rotating hub.

* * * * *